(12) United States Patent
Wiemker et al.

(10) Patent No.: US 12,361,609 B2
(45) Date of Patent: Jul. 15, 2025

(54) APPARATUS FOR GENERATING AN AUGMENTED IMAGE OF AN OBJECT

(71) Applicant: KONINKLIJKE PHILIPS N.V., Eindhoven (NL)

(72) Inventors: Rafael Wiemker, Kisdorf (DE); Liran Goshen, Pardes-Hanna (IL); Jörg Sabczynski, Norderstedt (DE); Tobias Klinder, Uelzen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 464 days.

(21) Appl. No.: 17/917,573

(22) PCT Filed: Apr. 6, 2021

(86) PCT No.: PCT/EP2021/058840
§ 371 (c)(1),
(2) Date: Oct. 7, 2022

(87) PCT Pub. No.: WO2021/204744
PCT Pub. Date: Oct. 14, 2021

(65) Prior Publication Data
US 2023/0144823 A1    May 11, 2023

(30) Foreign Application Priority Data
Apr. 9, 2020    (EP) .................................... 20168880

(51) Int. Cl.
*G06T 5/00* (2024.01)
*G06T 5/50* (2006.01)
(Continued)

(52) U.S. Cl.
CPC .............. *G06T 11/008* (2013.01); *G06T 5/50* (2013.01); *G06V 10/751* (2022.01);
(Continued)

(58) Field of Classification Search
CPC ......... G06T 11/008; G06T 2207/20081; G06T 2207/10081; G06T 2207/20221;
(Continued)

(56) References Cited

U.S. PATENT DOCUMENTS

| 5,115,394 A | 5/1992 | Walters |
| 5,754,618 A | 5/1998 | Okomoto |
| 2009/0135994 A1 | 5/2009 | Yu |

(Continued)

FOREIGN PATENT DOCUMENTS

WO    WO2018114964 A1    6/2018

OTHER PUBLICATIONS

Bhatnagar, Gaurav, QM Jonathan Wu, and Zheng Liu. "A new contrast based multimodal medical image fusion framework." Neurocomputing 157 (2015): 143-152.*

(Continued)

*Primary Examiner* — Li Liu
(74) *Attorney, Agent, or Firm* — Larry Liberchuk

(57) ABSTRACT

The invention refers to an apparatus (110) for generating an augmented image comprising a) a base image providing unit (111), wherein the base image is generated based on a combination of spectral image data, b) a contrast image providing unit (112), wherein the contrast image is generated based on a different combination of the spectral image data, c) a degree of saliency determination unit (113), wherein the degree of saliency is indicative of a difference between an image value of a voxel of the contrast image and an image value of a corresponding voxel of a predetermined template image, and d) an augmented image generation unit (114) for generating an augmented base image of the object by augmenting voxels of the base image based on the degree of saliency. The invention allows to provide the augmented base image with an improved image quality and information content.

14 Claims, 5 Drawing Sheets

(51) Int. Cl.
  *G06T 11/00* (2006.01)
  *G06V 10/75* (2022.01)
(52) U.S. Cl.
  CPC .............. *G06T 2207/10024* (2013.01); *G06T 2207/10081* (2013.01); *G06T 2207/20081* (2013.01); *G06T 2207/20221* (2013.01)
(58) Field of Classification Search
  CPC ....... G06T 19/006; G06T 5/50; G06V 10/751; G06V 10/462
  See application file for complete search history.

(56) References Cited

U.S. PATENT DOCUMENTS

| | | | | |
|---|---|---|---|---|
| 2011/0287811 | A1* | 11/2011 | Mattila | G06T 11/00 382/199 |
| 2023/0309943 | A1* | 10/2023 | van Walsum | G16H 50/20 600/425 |

OTHER PUBLICATIONS

Liu, Jingyu, et al. "Align, attend and locate: Chest x-ray diagnosis via contrast induced attention network with limited supervision." Proceedings of the IEEE/CVF International Conference on Computer Vision. 2019.*

Sandor, Christian, et al. "An augmented reality x-ray system based on visual saliency." 2010 IEEE international symposium on mixed and augmented reality. IEEE, 2010.*

PCT International Search Report, International application No. PCT/EP2021/058840, Jul. 5, 2021.

Gao S-Y et al., "Fused Monochromatic Imaging Acquired by Single Source Dual Energy CT in Hepatocellular Carcinoma During Arterial Phase: An Initial Experience", Chinese Journal of Cancer Research, vol. 26, No. 4, Aug. 2014 (Aug. 2014), pp. 437-443, XP055710766.

Chm M. et al., "Magnetic Resonance and Computed Tomography Image Fusion Using Saliency Map and Cross Bilateral Filter", Signal, Image and Video Processing, Springer London, London, vol. 13, No. 6, Mar. 20, 2019, pp. 1157-1164, XP036865604.

Li S. et al., "Pixel-Level Image Fusion: A Survey of the State of the Art", Information Fusion, Elsevier, US, vol. 33, May 19, 2016 (May 19, 2016), pp. 100-112, XP029596965.

Rassouli N. et al., "Detector-Based Spectral CT with a Novel Dual-Layer Technology: Principles and Applications" Insights into Imaging, vol. 8, pp. 589-598, 2017.

* cited by examiner

APPARATUS FOR GENERATING AN AUGMENTED IMAGE OF AN OBJECT

FIELD OF THE INVENTION

The invention relates to an apparatus, a method and a computer program for generating an augmented image of an object.

BACKGROUND OF THE INVENTION

In recent years, spectral imaging, in particular, spectral x-ray computed tomography imaging, has become more widely available in medical imaging facilities. When using spectral imaging, image data of an object are acquired with at least two different radiation spectra, for instance, with an x-ray radiation comprising a first wavelength and an x-ray radiation comprising a second wavelength. These image data acquired at different radiation spectra form spectral image data from which a plurality of different images of the object can be derived. For instance, the information provided in the spectral image data allows for determining images that only reflect the Compton effect or the photoelectric effect on the attenuation of the object. These so-called Compton images and photoelectric images can then be further combined in a plurality of ways to derive images from the spectral image data with a plurality of different information contents, for instance, to derive virtual monoenergetic images of different energy levels, material decomposition images, etc. All these derived images provide a different information content to a user, for instance, a physician, and show different levels of noise and sensitivity for certain materials. Thus, in order to access the full informational content of the acquired spectral image data a user often has to view a plurality of images derived from the spectral image data. For instance, the user has to view first a derived image showing the soft tissue in a region of interest with low noise and a high image quality and then a second derived image providing less image quality but showing certain materials of interest with a higher contrast. Thus, it would be helpful if the information provided by the spectral image data could be provided to a user more directly.

SUMMARY OF THE INVENTION

It is an object of the present invention to provide an apparatus, a method and a computer program which allow to provide an image derived from spectral image data comprising an improved information content and quality.

In a first aspect of the present invention, an apparatus for generating an augmented image of an object is presented, wherein the apparatus comprises a) a base image providing unit configured to provide a base image of an object, wherein the base image is generated based on a combination of spectral image data of the object acquired using a spectral x-ray imaging apparatus, b) a contrast image providing unit configured to provide a contrast image of the object, wherein the contrast image is generated based on a combination of the spectral image data of the object that is different from the combination used for generating the base image, c) a degree of saliency determination unit configured to determine a degree of saliency for each voxel of the contrast image, wherein the degree of saliency is indicative of a difference between an image value of a voxel of the contrast image and an image value of a corresponding voxel of a predetermined template image, and d) an augmented image generation unit configured to generate an augmented base image of the object by augmenting voxels of the base image based on the degree of saliency determined for corresponding voxels of the contrast image. The degree of saliency determination unit is configured to determine an approximation function that allows to approximate image values of voxels of the contrast image based on image values of corresponding voxels of the predetermined template image, and the degree of saliency determination unit is further configured to generate an approximated contrast image based on the approximation function and the predetermined template image and to determine the degree of saliency based on the approximation function. The approximation function can be determined such that it approximates image values of the voxels of the contrast image based on the image values of corresponding voxels of the predetermined template image as much as possible. Preferably, the approximation function refers to a linear regression function between the image values of the voxels of the contrast image and image values of the voxels of the predetermined template image. However, also a non-linear approximation can be provided between the image values of the voxels of the contrast image and the image values of the voxels of the predetermined template image. Thus, based on the approximation function, the predetermined template image can be used to generate an approximated contrast image, wherein the degree of saliency can then be determined based on the approximated contrast image. Preferably, the degree of saliency determination unit is configured to determine the degree of saliency of a voxel such that it is indicative of a deviation of an image value of a voxel of the contrast image from the image value of a corresponding voxel of the approximated contrast image. This allows to determine voxels in the contrast image that cannot be approximated by using the approximation function and the predetermined template image. These voxels can be regarded as containing information that was not already contained in the predetermined template image and thus contain information that might be interesting for augmenting the base image. Preferably, the augmented image generation unit is configured to generate the augmented base image by augmenting voxels of the base image, for which the degree of saliency indicates that the image values of the voxels show an upward deviation from the approximated image values of the voxels.

Since the degree of saliency is determined for each voxel of the contrast image and the base image is augmented by augmenting voxels of the base image based on the degree of saliency determined for corresponding voxels of the contrast image, an image providing a first information to a user can be augmented by additional information that is provided by a second image. Moreover, the base image can be chosen for providing a good image quality, wherein the additional information provided by the contrast image can be extracted and provided to the base image even if the contrast image itself has only a low image quality. Thus, the augmented base image can be provided with an improved image quality and information content.

The object for which an augmented image is generated can be any object that can be imaged with a spectral x-ray imaging apparatus. Preferably, the object refers to an anatomical structure within a region of interest of a living being, in particular a patient, wherein the patient can be a human or animal. However, the object can also be an inanimate object, for instance, a suitcase or bag in a security application.

The base image providing unit that can also be regarded as a base image provider is configured to provide a base image of an object, in particular, to provide the base image to the augmented image generation unit. The base image providing unit can be a storing unit, in which the base image of the object is stored and from which the base image can be retrieved for providing the same. The base image providing unit can also be a receiving unit for receiving the base image of the object and for providing the received image. Moreover, the base image providing unit can also be a base image generation unit being configured to generate the base image based on a combination of spectral image data of the object acquired using the spectral x-ray imaging apparatus. Preferably, the base image providing unit is a base image selection unit that is configured to provide a user with a plurality of images generated by different combinations of the spectral image data, wherein the user can then select one of the images as base image, wherein the base image providing unit is then configured to provide the selected base image.

The base image refers to an image that is generated based on a combination of spectral image data of an object acquired using a spectral x-ray imaging apparatus. The spectral x-ray imaging apparatus can be, for instance, based on a dual source technology, a fast kV switching technology, a photo counting detector technology, etc. The spectral image data acquired with the spectral x-ray imaging apparatus provide image data of the object acquired with at least two different radiation spectra and is thus indicative of the attenuation of the object with respect to the at least two different radiation spectra. If the object refers to an anatomical structure in the region of interest of a patient, it is preferred that the spectral image data is acquired after a contrast agent, like an iodine based contrast agent, has been provided to the patient. However, in other embodiments, the spectral image data can also be acquired without the application of a contrast agent to the object, in particular, if the object is an inanimate object. From the spectral image data a plurality of different images can be derived from different combinations of the spectral image data as explained in more detail, for instance, in the article "Detector-based spectral CT with a novel dual-layer technology: principles and applications" by N. Rassouli et al., Insights into Imaging, volume 8, pages 589-598 (2017).

The base image can refer to one of the images that is generated based on a combination of the spectral image data and can refer to a predetermined combination of spectral image data or to a combination of spectral image data chosen by the user, for instance, via a user input. Preferably, the base image comprises a high image quality, for instance, provides substantially no streak artifacts. Moreover, it is preferred that the base image provides information on soft tissue material in a region of interest of the object with an adequate sensitivity. Preferably, the base image refers to a virtual monoenergetic image, in particular, a virtual monoenergetic image at 200 keV, derived from the spectral image data. However, in some applications it might be preferred that the base image refers to a convention CT image, since this image type is associated with the most viewing expertise of radiologists.

The contrast image providing unit that can also be regarded as a contrast image provider is configured to provide a contrast image of the object, in particular, to provide the contrast image to the degree of saliency determination unit. The contrast image providing unit can be a storing unit, in which the contrast image of the object is already stored and from which the contrast image can be retrieved for providing the same. The contrast image providing unit can also be a receiving unit for receiving the contrast image of the object, for instance, from an input unit on which a user can select the contrast image, and for providing the received contrast image. Moreover, the contrast image providing unit can also be a contrast image generation unit being configured to generate the contrast image based on a combination of the spectral image data of the object.

The contrast image refers to an image that is generated based on a different combination of the spectral image data than the combination used for generating the base image. Thus, the base image and the contrast image refer to images comprising a different information content with respect to the object. Preferably, the contrast image comprises information on the distribution of a specific material, for instance, a contrast agent like iodine, in a region of interest of the object. Preferably, the contrast image refers to a virtual monoenergetic image, in particular, a virtual monoenergetic image at 40 keV, or a photoelectric image derived from the spectral image data. Moreover, if a contrast agent applied to a patient is an iodine based contrast agent, the contrast image can also refer to an iodine-density-map that quantifies an iodine density in each image region, in particular, voxel. This contrast image has the advantage that the iodine-density-map shows the distribution of the contrast agent in a region of interest very accurately and clearly, wherein calcium influenced structures, like bones, are not shown.

Generally, the base image and the contrast image can refer to two-dimensional images, three-dimensional images or even four-dimensional images taking into account a development of an object with time. In this context, the term "voxel" referring to an image element will also be used for 2D or 4D images and thus if addressing a 2D image the term "voxel" is to be interpreted as "pixel". Moreover, the base image and the contrast image can also refer to spectral images, i.e. to images that comprise more than one image value for each voxel, wherein the image values for each voxel reflect the attenuation of a corresponding part of the object at different radiation spectra. Thus, spectral images can also be considered as containing two different images generated by different combinations of the spectral image data.

The degree of saliency determination unit that can also be regarded as a degree of saliency determiner is configured to determine a degree of saliency for each voxel of the contrast image. The degree of saliency is indicative of a difference between an image value of a voxel of the contrast image and an image value of a corresponding voxel of a predetermined template image. Generally, the difference between an image value of a voxel of the contrast image and an image value of a corresponding voxel of a predetermined template image is indicative also of an information difference between the contrast image and the predetermined template image such that the degree of saliency is also indicative of this information difference. Preferably, the degree of saliency determination unit is configured to determine the degree of saliency as greater than zero only for image regions, in particular, voxels, that comprise an image value in the contrast image that is greater than the image value of the template image. The degree of saliency can generally be regarded as defining how much an image value of the contrast image stands out with respect to a predefined norm represented by the predetermined template image.

The predetermined template image can be predetermined, for instance, by a user by choosing the predetermined template image from a plurality of provided possible template images. Moreover, the predetermined template image can also automatically be predetermined based on the chosen base image and chosen contrast image and/or based on the goals of the spectral image acquisition. For instance, the predetermined template image can refer to an image generated based on a similar combination of spectral image data than used for the contrast image, wherein the spectral image data from which the template image is generated have been acquired from a healthy person. The spectral image data from which the predetermined template image is generated can then be selected, for instance, based on information on a patient, like the age, size, weight, etc., and/or on a reason for the examination of the patient. In this case, the degree of saliency is indicative of differences in the region of interest in a patient with respect to a healthy person. In cases in which the template image does not refer to an image that is generated based on the spectral image data of the patient, the selected template image can be registered to the contrast image based on generally well known registration methods. However, the template image might also already be provided in a way such that a registration is not necessary, for instance, if the template image refers to a constant template image.

The augmented image generation unit that can also be regarded as an augmented image generator is configured to generate an augmented base image of the object by augmenting voxels of the base image based on the degree of saliency determined for corresponding voxels of the contrast image. The augmented image generation unit can be configured to augment the voxels of the base image, for instance, by increasing the intensity of the voxels, by providing a predetermined color to the voxels, by changing a transparency of the color layer provided over the base image, etc. The augmenting of the voxels of the base image is based on the degree of saliency determined for corresponding voxels of the contrast image. For instance, the voxels of the base image can be augmented by adding a predetermined intensity value or providing the voxels with a predetermined color if the degree of saliency of the voxels lies above a predetermined threshold value for the degree of saliency. Additionally or alternatively, a functional relationship can be provided describing a relation between the degree of saliency and an intensity value or color value that should be added to the corresponding voxels, wherein the functional relationship can be, for instance, a linear function, a quadratic function or any other kind of function that is based on the degree of saliency.

The augmented base image is thus provided with additional information from the contrast image, in particular, with additional information of the degree of saliency of voxels of the contrast image with respect to the predetermined template image. For instance, the base image can refer to a spectral image with a good image quality, i.e. with substantially no image artifacts, and a good soft tissue contrast, whereas the base image does not contain much information about a distribution of a contrast agent. Further, in this example, the contrast image can refer to an image that provides a high contrast between the soft tissue and areas in which the contrast agent can be found and the template image can be chosen such that areas which contain the contrast agent are provided with a high degree of saliency. In this case, a high degree of saliency will be determined for the areas containing the contrast agent in the contrast image such that the augmented base image will not only contain the good quality and the good soft tissue contrast of the base image, but also contain voxels that are augmented in the areas containing the contrast agent. Therefore, a user like a physician can be provided with the information of soft tissue in the area of interest and also with the information with respect to the distribution of the contrast agent in the area of interest at first glance.

In an embodiment, the predetermined template image refers to the base image. Selecting the base image as template image has the advantage that voxels of the contrast image that contain another information content, i.e. deviate from the voxels of the base image, can be determined. By augmenting these voxels in the base image also their information content is provided to the base image. However, also other selections of the template image might be advantageous, for instance, by choosing the template image as an average image of the object averaged over a plurality of patients such that only voxels are identified and augmented that deviate from the average. Also, an image of the region of interest of a healthy patient might be used as template image such that only areas that show a high deviation from an image of a healthy patient are identified and augmented in the base image.

In an embodiment, the predetermined template image refers to a constant image in which the image value of each voxel is the same, wherein the degree of saliency determination unit is configured to determine the degree of saliency based on a difference between an image value of a voxel of the contrast image and the constant image value of the predetermined template image. Since the constant image only contains one image value, i.e. a constant image value, in this embodiment the template image can also be regarded as a constant. The constant image value can be chosen, for instance, as an average of all image values of the contrast image, as an image value below an image value that is expected for a specific material, for instance, a contrast agent, a constant image value that has been shown to be advantageous in previous cases, etc. The degree of saliency determination unit can be configured to determine the degree of saliency in this case, for instance, by subtracting the constant image value from the image value of each voxel of the contrast image, wherein a resulting difference image is indicative of the degree of saliency of each voxel. This embodiment allows for a very fast and simple determination of information that might be interesting in the contrast image.

In a preferred embodiment, the augmented image generation unit is configured to generate the augmented base image by augmenting voxels of the base image for which the degree of saliency indicates that the image value of the voxel of the contrast image is greater than the constant image value of the predetermined template image. For instance, in this embodiment the degree of saliency determination unit can be configured to set all image values of the difference image to zero which show a negative value, wherein then all remaining voxels comprising a positive image value in the difference image refer to voxels having an image value greater than the constant image value of the predetermined template image. The augmented image generation unit can then be configured, for instance, to augment the base image by simply adding the resulting difference image to the base image. In this embodiment, the degree of saliency refers to the difference between an image value of a voxel of the contrast image and the constant image value and refers to zero if the difference is negative, wherein the degree of saliency is directly used for augmenting the base image by adding the degree of saliency to the image value of a corresponding voxel in the base image.

Preferably, the contrast image refers to a virtual monoenergetic image or a photoelectric image. Virtual monoenergetic images and photoelectric images determined from spectral image data are advantageous as contrast image, since they provide a better contrast between areas containing a high contrasted material like a contrast agent, and soft tissue. Even more preferably, the contrast image refers to a virtual monoenergetic image simulating a radiation energy of 40 keV. However, also other images generated by a combination of the spectral image data containing information on specifically interesting materials in the region of interest can be used as contrast image.

In a preferred embodiment, the base image and the contrast image are virtual monoenergetic images, and the contrast image is generated referring to an energy that is lower than the energy for which the base image is generated. Generally, virtual monoenergetic images generated for a higher energy show a good contrast of soft tissue materials and also provide a high image quality with substantially no image artifacts, in particular, with less image artifacts than virtual monoenergetic images generated for lower energies. Virtual monoenergetic images generated for lower energies, however, are generally known to provide a higher contrast between areas containing a contrast agent and soft tissue areas, but are more sensitive to image artifacts. Thus, using virtual monoenergetic images as contrast image referring to an energy that is lower than the energy for which the base image is generated allows to augment a base image comprising a good image quality and a good soft tissue contrast with information of the distribution of a high contrast material like a contrast agent.

In an embodiment, the contrast image and the predetermined template image refer to spectral images, wherein a spectral image comprises for each voxel at least two intensity values indicative of the attenuation of a part of the object corresponding to the voxel at different radiation energy spectra, and the degree of saliency determination unit is configured to determine the degree of saliency based on a spectral metric indicative of a difference between the image values of the contrast image and the predetermined template image in spectral space defined by the different radiation energy spectra. A spectral image can be defined as an image, wherein each voxel of the image comprises at least two intensity values indicative of the attenuation of a part of the object corresponding to the voxel at different radiation energy spectra. For instance, a spectral image might comprise two virtual monoenergetic images such that each voxel of the spectral image comprises two intensity values that are indicative of the attenuation of the object corresponding to this voxel at different radiation energies. In this case, the degree of saliency determination unit can determine the degree of saliency based on a spectral metric in spectral space. The spectral space can be defined as being spanned by the different energy spectra at which intensity values are provided in the spectral images concerned such that the at least two intensity values of a voxel of a spectral image define the position of the voxel in the spectral space. For instance, if the spectral image comprises a virtual monoenergetic image generated for an energy of 40 keV and a virtual monoenergetic image generated for an energy of 200 keV, the intensity of a voxel in each of the images defines its position in the spectral space. Spectral metrics like Euclidean vector distances, a spectral vector angle or a Bhattacharyya distance, etc. can be used to determine a difference between the image values of the spectral contrast image and the predetermined spectral template image in spectral space. Preferably, a spectral contrast image and a spectral template image comprise values for each voxel referring to the same energy spectra, i.e. the images forming the spectral contrast image and the images forming the spectral template image are based on the same radiation energy spectra, respectively.

In an embodiment, the degree of saliency determination unit is configured to generate the degree of saliency using a trained deep learning algorithm, wherein the trained deep learning algorithm is trained based on training contrast images in which each voxel is associated with a degree of saliency. For instance, the training images can be generated by a user by using a plurality of possible contrast images of previous cases and providing these contrast images with annotations with respect to the degree of saliency of each voxel of these contrast images with respect to a predetermined template image, for instance, by marking different voxels in the contrast images with different colors referring to different degrees of saliency, etc. These annotated images are then provided to a deep learning algorithm in training as training images. Alternatively, the training images can be provided by using any of the above described embodiments for determining the degree of saliency, wherein the such determined degree of saliency is then provided together with the contrast image and optionally the template image as input to the deep learning algorithm for training. The deep learning algorithm can then learn which voxels of a contrast image should be provided with which degree of saliency. In this embodiment it can be regarded that the predetermined template image is reflected in the variables of the trained deep learning algorithm. Preferably, the trained deep learning algorithm refers to a convolutional neural network.

In an embodiment, the augmented image generation unit is configured to augment a voxel of the base image by adding an augmentation value to the voxel, wherein the augmentation value is based on the degree of saliency, and/or by providing a color to the voxel, wherein the color is based on the degree of saliency. For instance, the augmentation value can be equal to the degree of saliency, but can also be connected to the degree of saliency by a predetermined function like a linear or non-linear function. The color can also be connected to the degree of saliency by a color function determining which color or color intensity refers to which degree of saliency. The function connecting the augmentation value or color can be a continuous function or can be a discrete function.

In another aspect of the invention, a method for generating an augmented image of an object is presented, wherein the method comprises a) providing a base image of an object, wherein the base image is generated based on a combination of spectral image data of the object acquired using a spectral x-ray imaging apparatus, b) providing a contrast image of the object, wherein the contrast image is generated based on a combination of the spectral image data of the object that is different from the combination used for generating the base image, c) determining a degree of saliency for each voxel of the contrast image, wherein the degree of saliency is indicative of a difference between an image value of a voxel of the contrast image and an image value of a corresponding voxel of a predetermined template image, and d) generating an augmented base image of the object by augmenting voxels of the base image based on a degree of saliency determined for corresponding voxels of the contrast image. Determining a degree of saliency for each voxel of the contrast image comprises: determining an approximation function that allows to approximate image values of voxels of the contrast image based on image values of corresponding voxels of the predetermined template image; generating an approximated contrast image based on the approximation function and the predetermined template image; and determining the degree of saliency based on the approximation function.

In another aspect of the invention, a computer program for augmenting an image of an object is presented, wherein the computer program comprises program code means for causing the apparatus as described above to carry out the steps of the method as described above when the computer program is executed by the apparatus.

It shall be understood that the apparatus of claim 1, the method of claim 13, and the computer program of claim 14, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
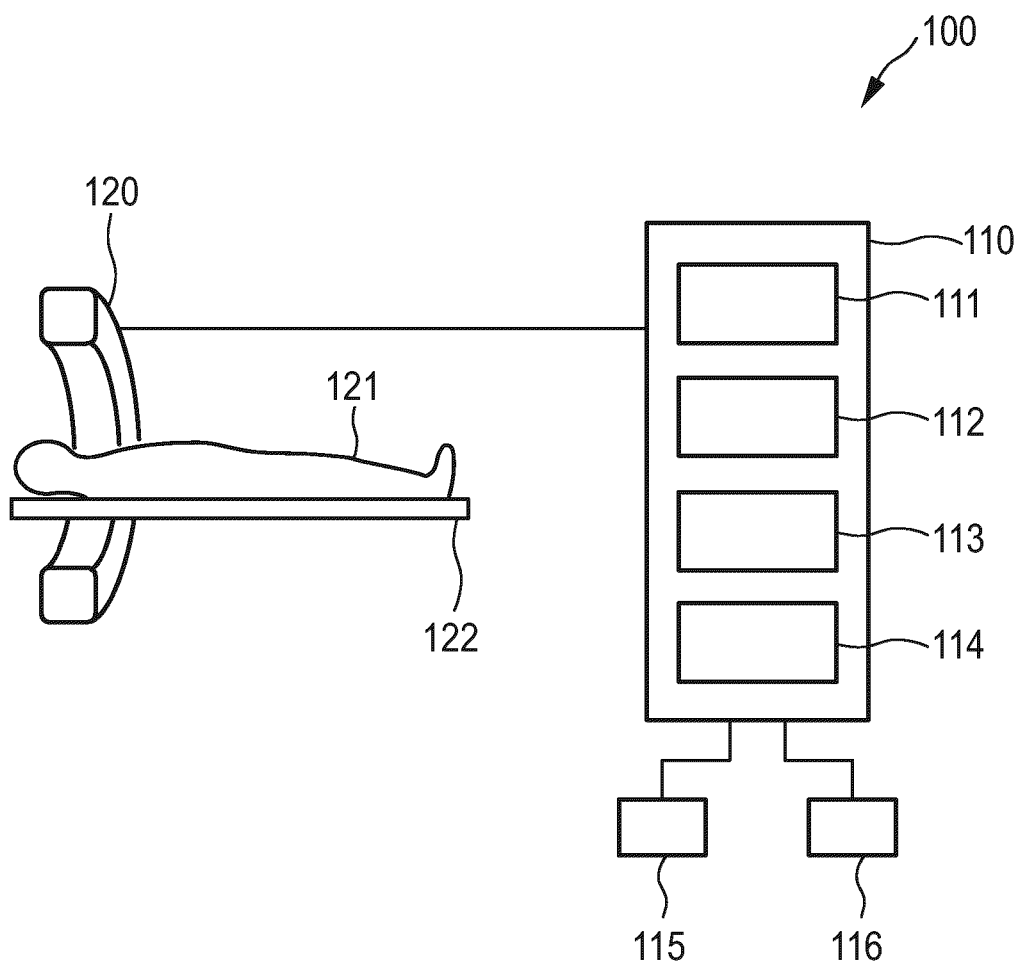
FIG. 1 shows schematically and exemplarily an embodiment of a spectral imaging system comprising an apparatus for generating an augmented image of an object.

FIG. 1 shows schematically and exemplarily an embodiment of a spectral imaging system comprising an apparatus for generating an augmented image of an object. In this embodiment, the spectral imaging system 100 comprises a spectral imaging unit 120, for instance, a dual energy x-ray CT imaging unit, for acquiring spectral image data of a region of interest of a patient 121 lying on a patient table 122. In a preferred embodiment, the patient 121 is injected with a contrast agent, for instance, an iodine contrast agent, before the acquisition of the spectral image data. The spectral image data of the patient 121 acquired by the spectral imaging unit 120 comprises spectral image data of an object referring to an anatomical structure in the region of interest.

For providing an augmented image of the object, in this example, the anatomical structure, the spectral imaging system 100 comprises an apparatus 110 for generating an augmented image of the object. The apparatus 110 comprises a base image providing unit 111, a contrast image providing unit 112, a degree of saliency determination unit 113 and an augmented image generation unit 114. Further, the apparatus 110 can comprise an input unit 115 like a mouse or a keyboard and/or a display unit 116, for instance, for displaying the augmented image.

The base image providing unit 111 is configured in this example for receiving the spectral image data acquired by the spectral imaging unit 120. The base image providing unit 111 is then configured to generate a base image based on a combination of the received spectral image data. In particular, the base image can be generated based on a preselected combination of the spectral image data. However, the base image providing unit 111 can also provide a plurality of possible generated base images to a user, for instance, via the display 116, and can then receive an input by the user, for instance, via the input unit 115, indicating the base image that should be selected. The base image providing unit 111 is then configured to provide the respective selected image as base image, in particular, to the augmented image generation unit 114.

The contrast image providing unit 112 is in this example also configured to receive the spectral image data acquired by the spectral imaging unit 120 and to generate the contrast image based on the received spectral image data. Also the contrast image can be generated based on a preselected combination of the spectral image data or can be selected by a user as described with respect to the base image providing unit 111. Generally, the contrast image is generated based on a different combination of the spectral image data than the base image. The contrast image providing unit 112 is then configured to provide the contrast image, in particular, to the degree of saliency determination unit 113.

The degree of saliency determination unit 113 is configured to determine a degree of saliency for each voxel of the contrast image. In particular, the degree of saliency is indicative of a difference between an image value of a voxel of the contrast image and an image value of a corresponding voxel of a predetermined template image. The predetermined template image can be predetermined, for instance, by providing a selection of possible template images to the user using the display 116, wherein the user can then select one of the presented template images as predetermined template image using the input unit 115. However, the predetermined template image can also be a default template image that is used for all objects or can be predetermined for specific cases, for instance, for specific selections of the contrast image and the base image. Moreover, the predetermined template image can be predetermined based on information provided with respect to the patient and the imaging procedure. For instance, the predetermined template image might be predetermined based on a contrast agent that is applied to the patient 121, a region of interest that should be imaged, an age or size of the patient 121, a reason for the examination of the patient 121, etc. The degree of saliency determined by the degree of saliency determination unit 113 can therefore be regarded as also being indicative of information that is provided by the contrast image that deviates from the information that is provided in the predetermined template image.

The augmented image generation unit 114 is then configured to generate an augmented base image of the region of interest of the patient 121 by augmenting voxels of the base image based on the degree of saliency determined for corresponding voxels of the contrast image. For instance, the augmented image generation unit 114 can add a degree of saliency determined for a voxel of the contrast image to the image value of the corresponding voxel of the base image. Alternatively or additionally, the augmented image generation unit 114 can be configured to provide a color to a voxel of the base image based on the degree of saliency for augmenting the voxel of the base image.

Figure 2:
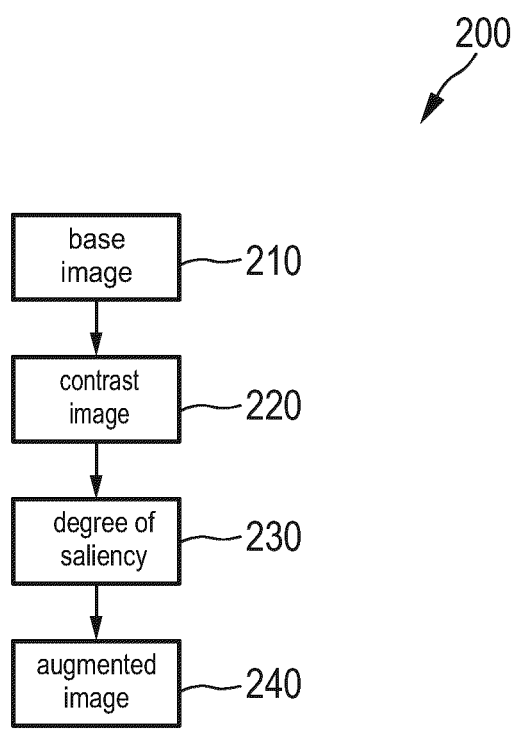
FIG. 2 shows a flowchart exemplarily illustrating an embodiment of a method for generating an augmented image of an object, FIG. 3 exemplarily illustrates an embodiment for determining a degree of saliency.

FIG. 2 shows schematically and exemplarily an embodiment of a method for generating an augmented image of an object. The method 200 comprises a first step 210 of providing a base image of the object, for instance, an anatomical structure of the patient 121, wherein the base image is generated based on a combination of spectral image data of the object acquired using, for instance, the spectral x-ray imaging apparatus 120. Further, the method 200 comprises a step 220 of providing a contrast image of the object, wherein the contrast image is generated based on a combination of the spectral image data of the object that is different from the combination used for generating the base image. Generally, the step 210 of providing a base image and the step 220 of providing a contrast image can be performed in any order or even at the same time. Based on the provided contrast image in step 230, a degree of saliency is determined for each voxel of the contrast image. In a last step 240, an augmented base image is then generated by augmenting voxels of the base image based on the degree of saliency determined in step 230 for corresponding voxels of the contrast image.

In the following, some preferred embodiments of the invention will be described in more detail with respect to the above setting of the apparatus 110. In a preferred embodiment, the predetermined template image is a constant image, i.e. an image comprising only one constant image value for all voxels. In this case, the degree of saliency determination unit 113 is configured to subtract the constant image, i.e. the constant image value, from the image value of each voxel of the contrast image resulting in a difference image. Further, in this embodiment, it is preferred that the degree of saliency determination unit 113 is configured to set all image values of the difference image to zero that refer to a negative image value, i.e. that are indicative of voxels in the contrast image containing image values that are lower than the constant image values. Optionally, the degree of saliency determination unit 113 can be configured to smooth the resulting difference image, for instance, by using a Gaussian or binomial smoothing algorithm, to reduce image noise and provide a difference image with a softer appearance, i.e. with reduced strong transitions between image values of neighboring voxels. The resulting image values of the difference image are then determined as the degree of saliency for each voxel of the contrast image. Thus, the resulting difference image can also be regarded as a degree of saliency image in which each image value is indicative of the degree of saliency of the contrast image of the corresponding voxel. In this embodiment, it is further preferred that the augmented image generation unit 114 is configured to generate the augmented base image by adding the degree of saliency image to the base image, i.e. to augment each voxel of the base image with the corresponding degree of saliency in the degree of saliency image. Optionally, the augmented image generation unit 114 can be configured to multiply each image value of the degree of saliency image with a weighting factor α that can be predetermined or interactively varied by a user. The augmented image can then be determined by the augmented image generation unit 114 using the following equation:

$$I_{boosted}(x) = I_{base}(x) + \alpha \cdot G*(\max(0, I_{lowE}(x) - T)),$$

wherein $I_{boosted}(x)$ refers to the image values of the augmented image for each voxel x, $I_{base}(x)$ refers to the image values of the base image for each voxel x, G refers to a Gaussian convolution function, $I_{lowE}(x)$ refers to the image values of the contrast image for each voxel x, and T refers to the constant image value of the predetermined template image.

In another preferred embodiment, the predetermined template image is selected as referring to the base image. Also in this embodiment the degree of saliency can be determined by subtracting the predetermined template image being in this case the base image from the contrast image in accordance with the above described embodiment. However, in this embodiment, it is preferred that the degree of saliency determination unit 113 is configured to determine an approximation function that allows to approximate image values of voxels of the contrast image based on image values of corresponding voxels of the base image, here being the predetermined template image. For determining the approximation function, preferably a regression function like a linear regression function or a non-linear regression function is used.

Figure 3:
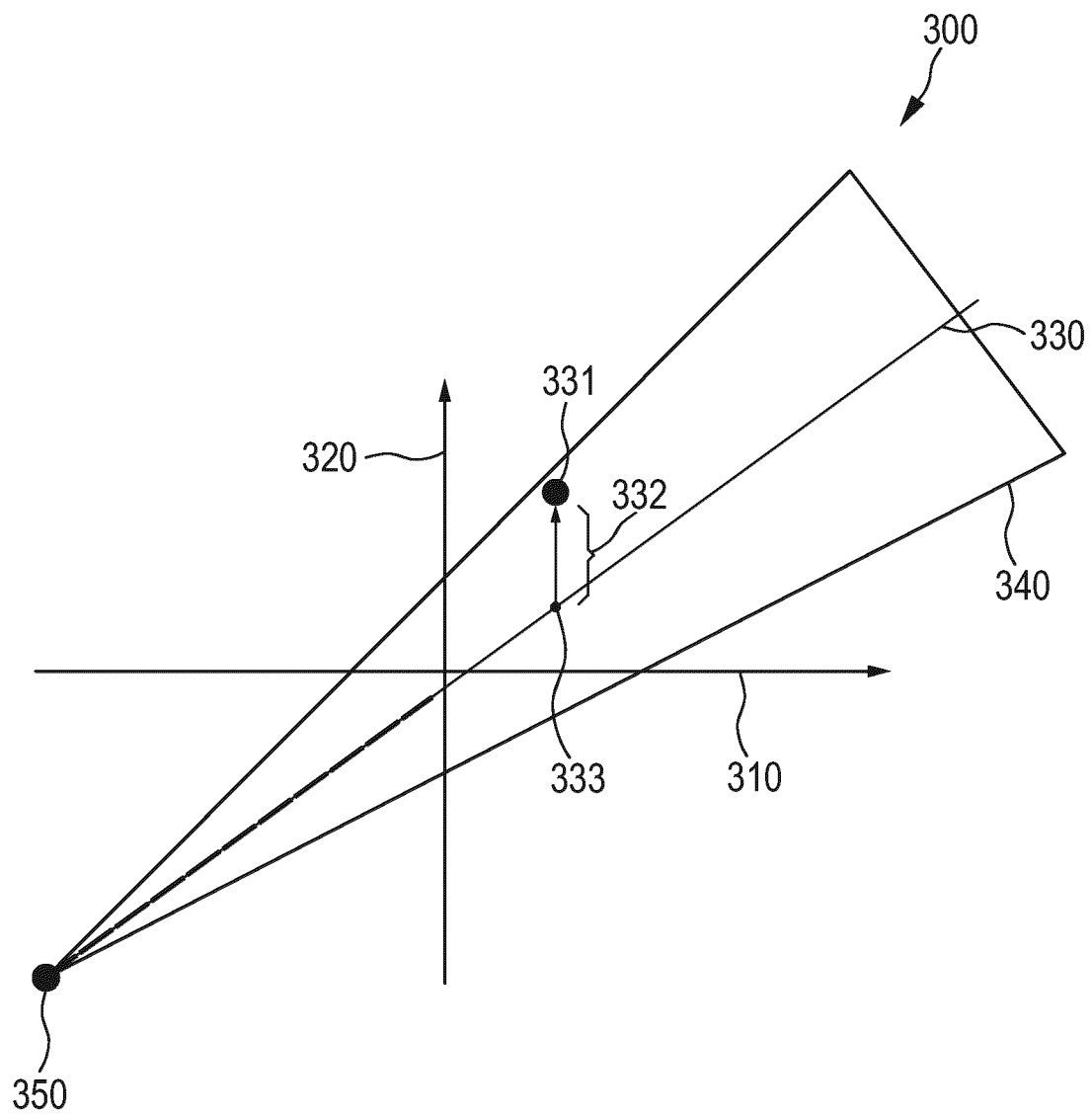

An example on how the approximation function can be determined is illustrated in FIG. 3. FIG. 3 shows an example in which the base image and thus the predetermined template image is chosen as a 200 keV virtual monoenergetic image, whereas the contrast image is chosen as a 40 keV virtual monoenergetic image. The x-axis 310 of the spectral space 300 shown in FIG. 3 refers to intensities, i.e. image values, corresponding to a 200 keV virtual monoenergetic spectrum and the y-axis 320 refers to intensities corresponding to a 40 keV virtual monoenergetic spectrum, wherein both axes are in this example provided in Hounsfield units. Each voxel of the base image and the contrast image can then be regarded as comprising two image values, one image value being the image value the voxel has in the base image and the other image value referring to the image value that the voxel comprises in the contrast image. Based on these two image values, each voxel can be placed in the spectral space, i.e. the location of a voxel in the spectral space 300 is defined by its intensity value in the 40 keV virtual monoenergetic image and its intensity value in the 200 keV mono energy image. If all voxels are placed in the spectral space accordingly, a scatter area 340 is formed by these voxels in the spectral space 300 referring to the area that is covered by the image values of the voxels. An exemplary placed voxel is point 331 which comprises a higher image value, in particular, intensity value, with respect to the 40 keV virtual monoenergetic spectrum than with respect to the 200 keV virtual monoenergetic spectrum. Point 350 corresponds to the image value of air in the respective energy spectrum. A linear regression can then be performed with respect to the scatter area 340 to determine a linear regression function 330 as approximation function. Preferably, the linear regression is only performed on the part of the scatter area 340 containing image values below zero as indicated by the part of the linear regression function 330 provided as dashed line, wherein the linear regression can then be used to also extrapolate into areas above zero as indicated by the part of the linear regression function 330 provided as solid line. It has been found that restricting the linear regression to areas below zero leads to a more reliable regression and also to a better augmentation result. The linear regression or extrapolation and thus the approximated image values of the contrast image can be represented by the equation $$I_{lowE\_Fit}(x) = \alpha + \beta \cdot I_{base}(x),$$

wherein $I_{lowE\_Fit}(x)$ refers to the approximated image values of the contrast image for each voxel x, $I_{base}(x)$ refers to the image values of the base image for each voxel x, and α and β refer to regression constants that are determined by the linear regression. After the approximation function 330 has been determined based on the regression, an approximated contrast image can be generated based on the approximation function and based on the predetermined template image, here the base image. The image values of such an approximated contrast image then all lie on the approximation function 330, as shown in FIG. 3. The image values of the voxels of the contrast image can then be compared with the image values of the approximated contrast image, in particular, a difference can be determined between the image values of the contrast image and the approximated image values of the approximated contrast image. Preferably, the difference is determined by subtracting an approximated image value from an image value of the contrast image for a corresponding voxel, wherein, if the subtraction result is positive, this result refers to the degree of saliency for this voxel and if the result is negative, the degree of saliency for this voxel is set to zero. This is represented in FIG. 3 for an exemplary voxel. Point 333 refers to an approximated image value for a voxel of the contrast image, whereas point 331 refers to the original image value of this voxel. The difference 332 can then be set as a degree of saliency for this voxel. The augmented image generation unit 114 is then configured to augment the base image by increasing the image value of a voxel of the base image in accordance with the determined degree of saliency, for instance, as described above with respect to the first preferred embodiment.

Figure 4:
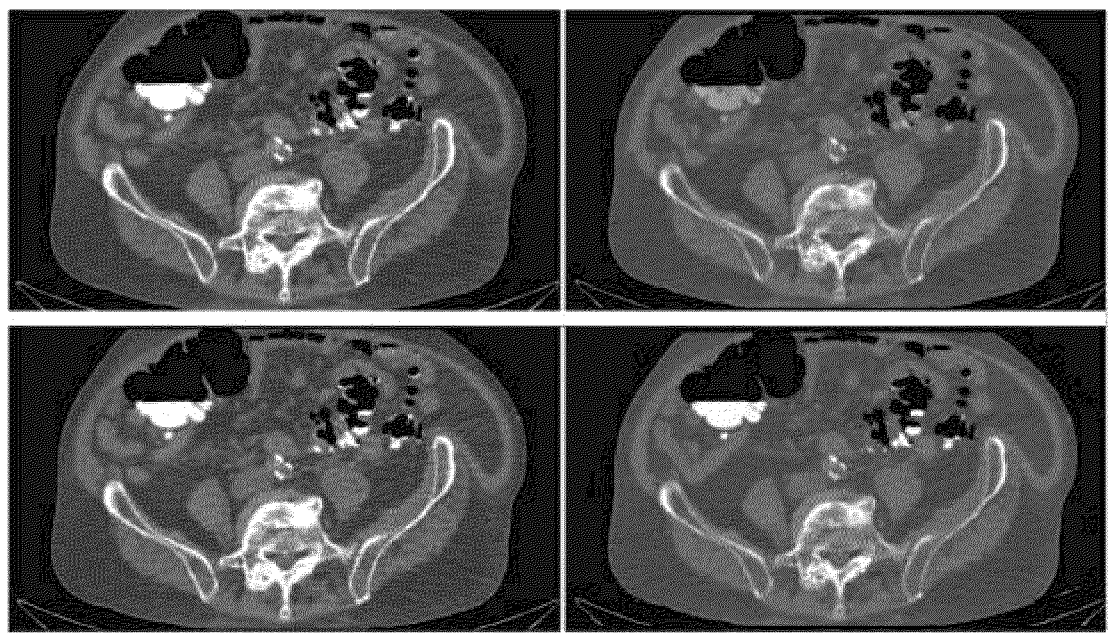
FIGS. 4 and 5 illustrate exemplarily results of augmented images.
Figure 5:
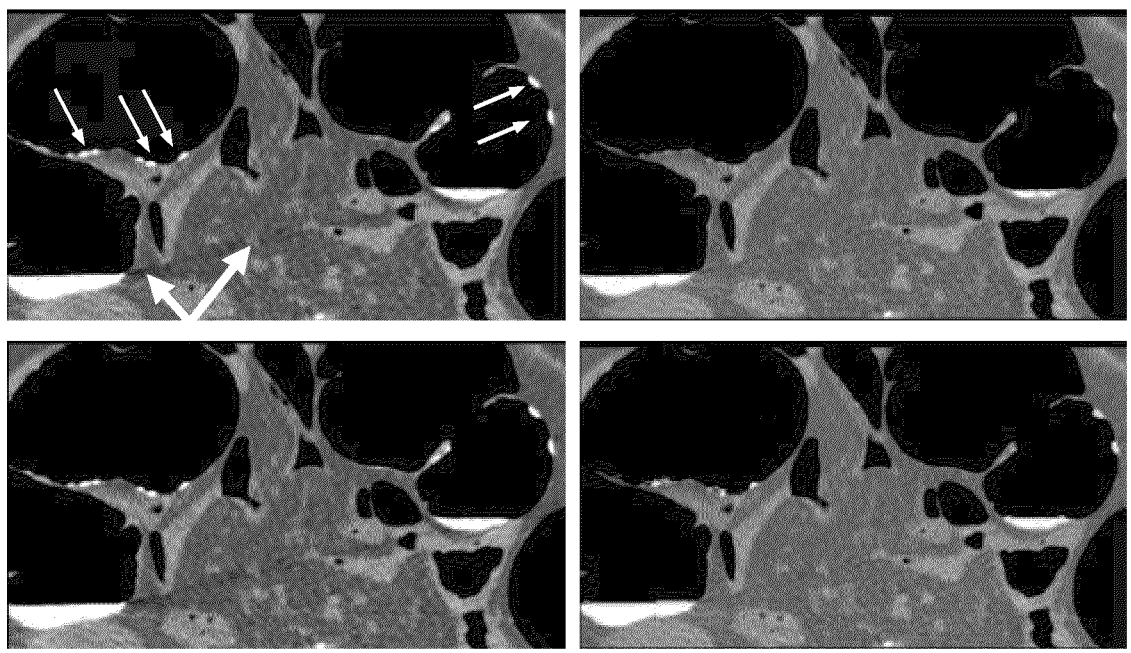

FIGS. 4 and 5 show results of augmented images generated based on the above described principle. FIG. 4 shows on the left two conventional CT slice images in comparison to the augmented images on the right. In the upper right corner, a 200 keV virtual monoenergetic image is shown comprising a lower noise level than the conventional CT image but also lower intensities for areas containing an iodine contrast material. On the bottom right an augmented image is shown generated in accordance with the above described embodiment, wherein it can be seen that in particular voxels referring to areas comprising the iodine contrast material have been augmented in comparison to the non-augmented image on the upper right, i.e. the base image, while in all other areas the preferred soft tissue manifestation of the 200 keV base image is maintained.

FIG. 5 also shows on the left conventional CT slice images for comparison. Typical streaking artifacts can be seen in these conventional CT slice images as marked by broad white arrows. Moreover, small areas containing iodine contrast material are indicated by thin white arrows. On the top right again a 200 keV virtual monoenergetic image used as base image is shown that does not contain any of the streaking artifacts shown in the conventional CT slice images, but that also does only show a very low intensity for areas containing the iodine contrast material. At the bottom right, an augmented image is shown generated in accordance with the above described embodiment, wherein it can clearly be seen that in particular the areas containing the iodine contrast material are enhanced, wherein at the same time the absence of streaking artifacts and the preferably soft tissue manifestation of the 200 keV base image are maintained.

Although in the above described embodiment it is preferred that the predetermined template image refers to the base image, the determination of the degree of saliency as described above can also be applied to other predetermined template images, in particular, to all template images that do not refer to a constant image. For instance, the predetermined template image could be an image of a health patient derived from spectral image data or non-spectral image data. Also in this case the degree of saliency can be determined by determining an approximation function in accordance with the above description. Moreover, the contrast image and the predetermined template image can in the above embodiment also refer to spectral images, as defined in the following embodiment.

In another preferred embodiment the contrast image and the predetermined template image refer to spectral images, wherein spectral images are defined as images comprising more than one image value for a voxel, wherein each image value is indicative of the attenuation of the part of the object corresponding to the voxel when being subject of different energy spectra. Thus, spectral images can be regarded as comprising at least two images generated by different combinations of the spectral images data. In this case the image value of a voxel of a spectral image can also be regarded as being a more dimensional image value, i.e. as referring to an image value vector. The contrast image and the predetermined template image can then be chosen such that they represent a plurality of different images resulting from different combinations of the spectral image data, wherein all of the different combinations of the spectral image data are also different from the combination of spectral image data from which the base image is generated. In this case, the degree of saliency being indicative of a difference between an image value of the voxel of the contrast image and an image value of the corresponding voxel of a predetermined template image, wherein in this case the image value refers to an image value vector, can be determined by representing the image value vectors in spectral space and applying spectral metrics for comparing the image value vectors. The spectral space is spanned by the different radiation spectra provided by the spectral images, i.e. the different spectral channels. For example, an Euclidean vector distance in spectral space to a spectral reference point defined, for instance, by the predetermined template image, can be used for determining the degree of saliency. Further, also a spectral vector angle in spectral space of an image value vector with respect to a spectral origin point and a reference vector defined, for instance, by the predetermined template image, can be used to determine a degree of saliency. Moreover, also a Bhattacharyya distance, i.e. a quadratic weighted distance to a spectral reference ellipsoid, for instance, defined by the predetermined template image, can be used. Generally the representations of the image value vectors of the spectral images in a spectral space can be determined in a similar way as described with respect to the above embodiment referring to provide an approximation function. However, since the spectral space in an embodiment referring to spectral images will in most cases comprise more than two dimensions, a drawing similar to FIG. 3 is not available.

The augmented image generation unit 114 can then be configured to generate the augmented base image based on the degree of saliency that is determined by the proximity of a more dimensional image value of the contrast image to the more dimensional image value of the predetermined template image. Thus, in this case the degree of saliency is indicative of a distance between points in a more dimensional space, in particular, in a spectral space comprising more than two dimensions. In this way, information can be identified in the spectral contrast image, i.e. in a plurality of combinations of the spectral image data, that is not provided by the spectral template image. For instance, if the spectral template image refers to different combinations of spectral image data acquired for a healthy patient, this method allows to determine voxels in the spectral image data of the patient that in a general overview over a plurality of possible radiation spectra provide an additional information and thus might be interesting for augmenting the base image.

In a further embodiment the degree of saliency determination unit 113 comprises a trained deep learning algorithm, in particular, a convolutional neural network, that is trained to determine the degree of saliency for each voxel of the contrast image. Preferably, the deep learning algorithm is trained by providing contrast images, for instance, virtual monoenergetic images, photoelectric images or spectral images to the deep learning algorithm, wherein for these training contrast images for each voxel a degree of saliency has been determined, for instance, by a user or by any of the above described principles. The deep learning algorithm can then learn to determine the degree of saliency of each voxel of a contrast image based on the contrast image without a further input, wherein it can be regarded that the predetermined template image in this case is part of the variable settings of the trained deep learning algorithm. Based on the degree of saliency that is determined by the trained deep learning algorithm with a contrast image as input, a base image can then be augmented.

Spectral CT imaging systems generate a number of spectral channels, i.e. at least two, from low- to high-energy levels which are governed by the Compton and photoelectric effect to a varying degree. The spectral channels, i.e. spectral image data, can also be converted into various representations, for instance, pure Compton, pure photoelectric, and pure virtual monoenergetic images. Generally, high-keV virtual monoenergetic images are known to have less streaking artifacts and less image noise, and to depict soft tissue material more sensitively, and are therefore often preferred for viewing. Also, conventional images, i.e. non-virtual-monoenergetic images, are often preferred for viewing because of existing reading habits and accumulated expertise. On the other hand, low-keV virtual monoenergetic images are known to show contrast material more sensitively, whereas a weak concentration of contrast material is not well visible in high-keV virtual monoenergetic images or conventional images. Weak contrast material patches may however be helpful to detect and discriminate anomalies such as polyps, stool, et cetera.

The invention thus proposes in an embodiment that a base image is chosen arbitrarily by a user, for instance, as a conventional or high-keV virtual monoenergetic image, and that this image is augmented, i.e. 'contrast-boosted', by adding intensity or color at image locations which show high intensity in a low-keV virtual monoenergetic image or a photoelectric image.

In an embodiment, a certain threshold value T, i.e. a constant image as template image, is subtracted from a low-keV mono energy image or photoelectric image as contrast image, and the resulting subtraction image, i.e. difference image, is then lower-clamped at zero, leaving only high contrast areas with positive values, otherwise mostly zeros, thus yielding a high-contrast image. Optionally, the difference image can be smoothed, e.g. by Gaussian or binomial smoothing, to reduce noise and to yield a softer appearance. The smoothed difference image can then be added in a voxel-wise fashion to the base image. Optionally, before the addition the difference image can be multiplied with a weighting factor $\alpha$, which can be interactively varied by the user.

In an embodiment, the intensities of the chosen base image that in this case also refers to the template image and a low-keV virtual monoenergetic image or photoelectric image as contrast image are compared on a voxel-wise basis. A regression is performed such that the low-keV virtual monoenergetic image or photoelectric image is predicted by the base image, e.g. by a linear regression fit, but also non-linear fits are possible. Optionally, as the most high contrast points are expected for areas denser than water areas, the regression is restricted to points where the Hounsfield value is below 0. After the regression is established, a low-keV regression value as approximated contrast image value, is computed for all voxels x. For voxels, for which the actual low-keV value is higher than the regression value as predicted by the regression from the base image value, the displayed intensity of the base image is increased in intensity by this difference that represents the degree of saliency in this case. The result is an augmented, i.e. 'boosted', base image which comprises the better image quality of the base image while also showing areas of weak contrast material concentration.

In an embodiment, spectrally salient voxels are determined, by comparing a spectral contrast image to a spectral template image. The proximity to the spectral templates can be measured by several metrics in a spectral space spanned by the spectral channels. The metrics used can refer, for instance, to an Euclidean vector distance in the spectral space to a spectral reference point, a spectral vector angle with respect to a spectral origin point and a reference point, a Bhattacharyya distance, i.e. quadratic weighted distance, to a spectral reference ellipsoid, etc. The image value of the base image can then be increased according to the degree of saliency as determined by the proximity to spectral template image.

In an embodiment, during a training phase a user can annotate areas, for instance, in low-keV virtual monoenergetic images or photoelectric images as contrast images which they consider to be spectrally salient. A convolutional neural network (CNN) can then be trained using deep learning algorithms to recognize these areas on a voxel level given the multispectral input images. In the deployment phase, the trained CNN generates voxel level responses from the multispectral input images, and these voxels are emphasized in intensity in the base image.

The invention as described above has the advantage that a user can assess just one image type, rather than having to read two or even a whole series of different image representations. Moreover, for diagnostic viewing, i.e. reading, a user can freely choose either a conventional or a virtual monoenergetic image of his/her preference to optimally support his/her workflow, without having to worry about compromising contrast-agent visibility. If the color white is used for the augmented salient voxels, then the appearance of the augmented image is very similar to standard images so that no need arises to develop new reading expertise. Moreover, this allows deployment on widespread black-white monitors. Further, intensities are only increased, i.e. 'boosted', but never decreased, so that dark streaks stemming from, for instance, beam starvation in low energy images are not carried over, but cues from high contrast from iodine are. Also the above described augmentation embodiments are quick enough for on-the-fly computation in interactive real-time and do not require additional storage of the augmented image volumes. The augmented images can also be used as input for existing image processing algorithms, which are trained for conventional images, but benefit from the boosting of weak contrast areas, e.g. so-called virtual cleansing of tagged stool in CT-colonoscopy.

Although in the above embodiment a specific combination of contrast image and base image was used as example, in other embodiments also another combination of base image and contrast image can be used. For instance, although it is generally preferred that the base image refers to a high keV virtual monoenergetic image, like a 200 keV virtual monoenergetic image, the base image can also refer to any combination of the spectral image data, for instance, of a Compton image or a material decomposition image. Although it is also generally preferred that the contrast image refers to a photoelectric image or a low keV virtual monoenergetic image, like a 40 keV virtual monoenergetic image, the contrast image can also refer to any other kind of image like a Compton image, a material decomposition image or any other combination of the spectral image data.

Although the above embodiments are described with respect to a medical environment, wherein the object refers to an anatomical structure within a patient, the above described principles can also be easily applied to other objects, in particular inanimate objects, like suitcases or bags. In particular, the invention can also be applied to security scenarios like the scanning of bags for dangerous or forbidden objects.

Although it is preferred that a patient is injected with a iodine based contrast agent before acquiring the spectral images, also other contrast agents, like barium based contrast agents could be applied. Moreover, based on the clinical reasons for the spectral images, also no contrast agent can be used. In this case, a base image and a contrast image can be used that refer to other information in the anatomy of the patient that are also visible without a contrast agent.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing of the contrast image, the providing of the base image, the determining of a degree of saliency or the augmenting of the base image, etc, performed by one or more several units or devices can be performed by any other number of units or devices. These procedures can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention refers to an apparatus for generating an augmented image comprising a) a base image providing unit, wherein the base image is generated based on a combination of spectral image data, b) a contrast image providing unit, wherein the contrast image is generated based on a different combination of the spectral image data, c) a degree of saliency determination unit, wherein the degree of saliency is indicative of a difference between an image value of a voxel of the contrast image and an image value of a corresponding voxel of a predetermined template image, and d) an augmented image generation unit for generating an augmented base image of the object by augmenting voxels of the base image based on the degree of saliency. The invention allows to provide the augmented base image with an improved image quality and information content.

The invention claimed is:

1. An apparatus for generating an augmented image of an object, comprising:
   a base image providing unit configured to provide a base image of an object, wherein the base image is generated based on a combination of spectral image data of the object acquired using a spectral x-ray imaging apparatus;
   a contrast image providing unit configured to provide a contrast image of the object, wherein the contrast image is generated based on a combination of the spectral image data of the object that is different from the combination used for generating the base image;
   a degree of saliency determination unit configured to determine a degree of saliency for each voxel of the contrast image, wherein the degree of saliency is indicative of a difference between an image value of a voxel of the contrast image and an image value of a corresponding voxel of a predetermined template image; and
   an augmented image generation unit configured to generate an augmented base image of the object by augmenting voxels of the base image based on the degree of saliency determined for corresponding voxels of the contrast image, wherein the degree of saliency determination unit is configured to determine an approximation function that allows to approximate image values of voxels of the contrast image based on image values of corresponding voxels of the predetermined template image, and wherein the degree of saliency determination unit is further configured to generate an approximated contrast image based on the approximation function and the predetermined template image and to determine the degree of saliency based on the approximation function.

2. The apparatus according to claim 1, wherein the degree of saliency determination unit is configured to determine the degree of saliency of a voxel such that it is indicative of a deviation of an image value of the voxel of the contrast image from the image value of a corresponding voxel of the approximated contrast image.

3. The apparatus according to claim 2, wherein the augmented image generation unit is configured to generate the augmented base image by augmenting voxels of the base image, for which the degree of saliency indicates that the image values of the voxels show an upward deviation from the approximated image values of the voxels.

4. The apparatus according to claim 1, wherein the approximation function refers to a linear regression function between the image values of the voxels of the contrast image and image values of the voxels of the predetermined template image.

5. The apparatus according to claim 1, wherein the predetermined template image refers to the base image.

6. The apparatus according to claim 1, wherein the predetermined template image refers to a constant image in which the image value of each voxel is the same, wherein the degree of saliency determination unit is configured to determine the degree of saliency based on a difference between an image value of a voxel of the contrast image and the constant image value of the predetermined template image.

7. The apparatus according to claim 6, wherein the augmented image generation unit is configured to generate the augmented base image by augmenting voxels of the base image for which the degree of saliency indicates that the image value of the voxel of the contrast image is greater than the constant image value of the predetermined template image.

8. The apparatus according to claim 1, wherein the contrast image refers to a virtual monoenergetic image or a photoelectric image.

9. The apparatus according to claim 1, wherein the base image and the contrast image are virtual monoenergetic images, and wherein the contrast image is generated referring to an energy that is lower than the energy for which the base image is generated.

10. The apparatus according to claim 1, wherein the contrast image and the predetermined template image refer to spectral images, wherein a spectral image comprises for each voxel at least two intensity values indicative of the attenuation of a part of the object corresponding to the voxel at different radiation energy spectra, and wherein the degree of saliency determination unit is configured to determine the degree of saliency based on a spectral metric indicative of a difference between the image values of the contrast image and the predetermined template image in spectral space defined by the different radiation energy spectra.

11. The apparatus according to claim 1, wherein the degree of saliency determination unit is configured to generate the degree of saliency using a trained deep learning algorithm, wherein the trained deep learning algorithm is trained based on training contrast images in which each voxel is associated with a degree of saliency.

12. The apparatus according to claim 1, wherein the augmented image generation unit is configured to augment a voxel of the base image by adding an augmentation value to the voxel, wherein the augmentation value is based on the degree of saliency, and/or by providing a color to the voxel, wherein the color is based on the degree of saliency.

13. A method for generating an augmented image of an object, comprising:
providing a base image of an object, wherein the base image is generated based on a combination of spectral image data of the object acquired using a spectral x-ray imaging apparatus;
providing a contrast image of the object, wherein the contrast image is generated based on a combination of the spectral image data of the object that is different from the combination used for generating the base image;
determining a degree of saliency for each voxel of the contrast image, wherein the degree of saliency is indicative of a difference between an image value of a voxel of the contrast image and an image value of a corresponding voxel of a predetermined template image; and
generating an augmented base image of the object by augmenting voxels of the base image based on a degree of saliency determined for corresponding voxels of the contrast image,
wherein determining a degree of saliency for each voxel of the contrast image comprises: determining an approximation function that allows to approximate image values of voxels of the contrast image based on image values of corresponding voxels of the predetermined template image; generating an approximated contrast image based on the approximation function and the predetermined template image; and determining the degree of saliency based on the approximation function.

14. A non-transitory computer-readable medium for storing executable instructions, which cause a method to be performed for generating an augmented image of an object, the method comprising:
providing a base image of an object, wherein the base image is generated based on a combination of spectral image data of the object acquired using a spectral x-ray imaging apparatus;
providing a contrast image of the object, wherein the contrast image is generated based on a combination of the spectral image data of the object that is different from the combination used for generating the base image;
determining a degree of saliency for each voxel of the contrast image, wherein the degree of saliency is indicative of a difference between an image value of a voxel of the contrast image and an image value of a corresponding voxel of a predetermined template image; and
generating an augmented base image of the object by augmenting voxels of the base image based on a degree of saliency determined for corresponding voxels of the contrast image,
wherein determining a degree of saliency for each voxel of the contrast image comprises: determining an approximation function that allows to approximate image values of voxels of the contrast image based on image values of corresponding voxels of the predetermined template image; generating an approximated contrast image based on the approximation function and the predetermined template image; and determining the degree of saliency based on the approximation function.

* * * * *